United States Patent
Choi

(10) Patent No.: US 9,493,056 B2
(45) Date of Patent: *Nov. 15, 2016

(54) FRONT DOOR DEVICE IN VEHICLE

(71) Applicant: Hyundai Motor Company, Seoul (KR)

(72) Inventor: Jae Hong Choi, Gwangmyeong-si (KR)

(73) Assignee: Hyundai Motor Company, Seoul (KR)

(\*) Notice: Subject to any disclaimer, the term of this patent is extended or adjusted under 35 U.S.C. 154(b) by 0 days.

This patent is subject to a terminal disclaimer.

(21) Appl. No.: 14/522,340

(22) Filed: Oct. 23, 2014

(65) Prior Publication Data

US 2015/0183304 A1 Jul. 2, 2015

(30) Foreign Application Priority Data

Dec. 27, 2013 (KR) ........................ 10-2013-0165791

(51) Int. Cl.
| | | |
|---|---|---|
| *B60J 5/04* | (2006.01) | |
| *B60J 5/06* | (2006.01) | |
| *E05C 17/60* | (2006.01) | |
| *E05D 15/10* | (2006.01) | |

(52) U.S. Cl.
CPC ........ *B60J 5/047* (2013.01); *B60J 5/06* (2013.01); *E05D 13/04* (2013.01); *E05D 15/1081* (2013.01); *E05D 2015/1086* (2013.01)

(58) Field of Classification Search
CPC .............. B60J 5/047; B60J 5/12; B60J 5/06; B60J 5/0479; E05Y 2900/531; E05D 15/1047; E05D 15/101; E05D 15/1081

USPC ......... 49/208, 209, 210, 216, 221, 352, 360; 296/155

See application file for complete search history.

(56) References Cited

U.S. PATENT DOCUMENTS

| | | | | |
|---|---|---|---|---|
| 4,945,677 A * | 8/1990 | Kramer | ...................... | B60J 5/06 296/155 |
| 5,168,666 A * | 12/1992 | Koura | ........................ | B60J 5/06 49/280 |
| 5,967,595 A * | 10/1999 | Heya | .......................... | B60J 5/06 296/155 |
| 5,992,097 A * | 11/1999 | Makiuchi | ............ | E05D 15/1047 49/209 |
| 6,036,257 A * | 3/2000 | Manuel | ...................... | B60J 5/06 296/155 |
| 6,183,039 B1 * | 2/2001 | Kohut | ................. | E05D 15/1081 296/146.12 |

(Continued)

FOREIGN PATENT DOCUMENTS

KR 1998-069736 A 10/1998

*Primary Examiner* — Justin Rephann
(74) *Attorney, Agent, or Firm* — Morgan, Lewis & Bockius LLP

(57) ABSTRACT

A front door device for a vehicle may include a front door, an upper rail mounted to the front door in a width direction, an upper slider inserted in the upper rail to support the upper rail, a lower rail mounted to a vehicle body, a lower slider inserted in the lower rail and movable along the lower rail, an upper support structure having one end connected to the upper slider and the other end mounted to the vehicle body for supporting the upper slider, and a connection structure for connecting the lower slider to the upper rail. The front door device permits the front door to be opened by sliding it forward in the length direction of the vehicle.

18 Claims, 17 Drawing Sheets

(56) References Cited

U.S. PATENT DOCUMENTS

| | | | | |
|---|---|---|---|---|
| 6,530,619 B2* | 3/2003 | Fukumoto | ............. | E05F 15/646 296/155 |
| 6,793,268 B1* | 9/2004 | Faubert | ............. | B60J 5/06 296/146.11 |
| 7,611,190 B1* | 11/2009 | Elliott | ............. | B60J 5/06 296/146.12 |
| 2006/0181109 A1* | 8/2006 | Mitsui | ............. | B60J 5/06 296/155 |
| 2006/0249983 A1* | 11/2006 | Heuel | ............. | B60J 5/06 296/155 |
| 2007/0096504 A1* | 5/2007 | Kothe | ............. | B60J 5/06 296/155 |
| 2008/0100091 A1* | 5/2008 | Kunishima | ............. | B60J 5/06 296/146.1 |
| 2008/0106120 A1* | 5/2008 | Kim | ............. | B60J 5/062 296/190.01 |
| 2009/0051194 A1* | 2/2009 | Elliott | ............. | B60J 5/0479 296/146.11 |
| 2009/0072583 A1* | 3/2009 | Elliott | ............. | E05D 15/1081 296/155 |
| 2009/0200833 A1* | 8/2009 | Heuel | ............. | B60J 5/06 296/155 |
| 2009/0230724 A1* | 9/2009 | Fischer | ............. | B60J 5/06 296/155 |
| 2010/0018125 A1* | 1/2010 | Oh | ............. | E05C 17/60 49/449 |
| 2010/0263283 A1* | 10/2010 | Yoshioka | ............. | B60J 5/06 49/210 |
| 2011/0126466 A1* | 6/2011 | Adachi | ............. | E05F 15/646 49/262 |
| 2012/0031003 A1* | 2/2012 | Boettcher | ............. | B60J 5/06 49/154 |
| 2012/0031004 A1* | 2/2012 | Boettcher | ............. | B60J 5/06 49/154 |
| 2013/0152477 A1* | 6/2013 | Choi | ............. | E06B 3/46 49/350 |
| 2013/0186002 A1* | 7/2013 | Mather | ............. | B60J 5/06 49/258 |
| 2013/0205671 A1* | 8/2013 | Ito | ............. | B60J 5/06 49/420 |
| 2014/0062124 A1* | 3/2014 | Accossato | ............. | B60J 5/06 296/155 |
| 2014/0232132 A1* | 8/2014 | Kwon | ............. | B60J 5/06 296/155 |
| 2014/0237901 A1* | 8/2014 | Kwon | ............. | E05B 83/04 49/449 |
| 2014/0265430 A1* | 9/2014 | Choi | ............. | B60J 5/047 296/146.7 |
| 2014/0292022 A1* | 10/2014 | Maruyama | ............. | B60J 5/047 296/155 |
| 2014/0292037 A1* | 10/2014 | Fukumoto | ............. | B60J 5/06 296/202 |
| 2014/0312650 A1* | 10/2014 | Maruyama | ............. | B60J 5/06 296/146.9 |
| 2014/0318017 A1* | 10/2014 | Linkner | ............. | B60J 5/047 49/176 |
| 2015/0033503 A1* | 2/2015 | Yamada | ............. | B60J 5/06 16/91 |
| 2015/0097391 A1* | 4/2015 | Thiele | ............. | B60R 13/0275 296/146.7 |

* cited by examiner

FRONT DOOR DEVICE IN VEHICLE

CROSS-REFERENCE TO RELATED APPLICATION

The present application claims priority of Korean Patent Application Number 10-2013-0165791 on Dec. 27, 2013, the entire contents of which application are incorporated herein for all purposes by this reference.

NAMES OF THE PARTIES TO A JOINT RESEARCH AGREEMENT

Hyundai Motor Company and Kwangjin Co., Ltd were parties to a joint research agreement prior to the effective filing date of the instant application.

BACKGROUND OF INVENTION

Field of Invention

The present invention relates a front door device in a vehicle. More particularly, the present invention relates to a front door device in a vehicle which moves forward in a length direction of the vehicle to open a door opening in the vehicle body and moves backward in the length direction of the vehicle to close the door opening.

Description of Related Art

In general, the vehicle has a predetermined sized cabin formed therein for boarding of a driver and accompanying occupants therein, and cabin opening/closing doors mounted to the vehicle body for opening/closing the cabin.

In a case of a passenger vehicle, the cabin opening/closing doors are front doors mounted to a front side of the vehicle in the length direction of the vehicle, and rear doors mounted to a rear side of the vehicle in the length direction of the vehicle, wherein, in general, the front doors and the rear doors are rotatably mounted to the vehicle body with hinges.

In a case of a van on which many people may board, the cabin opening/closing door opens/closes the cabin as the cabin opening/closing door slides forward/backward in the length direction of the vehicle.

Since the sliding type cabin opening/closing door in the van opens the cabin as the opening/closing door moves backward in the length direction of the vehicle, and closes the cabin as the opening/closing door moves forward in the length direction of the vehicle, the sliding type cabin opening/closing door in the van has a space required for opening/closing the door smaller than the hinge type cabin opening/closing door in the passenger vehicle, to have an advantage of opening the door opening formed in the vehicle body completely even in an opening/closing space with a small width.

However, a related art sliding type cabin opening/closing door has a drawback in that the related art sliding type cabin opening/closing door in the van requires three support and guide rails and components related thereto for respectively supporting an upper side, a middle side and a lower side of the door, resulting in the increase of a weight of the vehicle and a number of components, and the decrease of design freedoms of the vehicle.

The above information disclosed in this Background section is only for enhancement of understanding of the background of the invention and therefore it may contain information that does not form the prior art that is already known in this country to a person of ordinary skill in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a front door device in a vehicle having advantages of enabling easy opening/closing of the front door even if a door opening/closing space is small, reducing a number of components, weight, and cost of the vehicle, and improving vehicle exterior design freedoms.

Devised taking above problems and/or other problems into account, the present invention is to provide a front door device in a vehicle which can be slidably opened/closed in backward/forward in a length direction of the vehicle for easy opening/closing of the front door even if a door opening/closing space is small, in which the front door is supported only with two rails for reducing a number of components, weight, and cost of the vehicle, and which permits to improve vehicle exterior design freedoms.

In various aspects of the present invention, a front door device in a vehicle may include: a front door; an upper rail mounted to the front door in a width direction thereof; an upper slider inserted in the upper rail to support the upper rail; a lower rail mounted to a vehicle body; a lower slider inserted in the lower rail and movable along the lower rail; an upper support structure having one end connected to the upper slider and the other end mounted to the vehicle body for supporting the upper slider; and a connection structure for connecting the lower slider to the upper rail.

The upper rail may include a center rail positioned at a middle portion of the upper rail in a height direction, an upper side rail positioned over the center rail, and a lower side rail positioned under the center rail.

The center rail, the upper side rail and the lower side rail each may have a "⊏" shaped cross section continuous in a length direction thereof, openings of the upper side rail and the lower side rail may be arranged substantially perpendicular to an opening of the center rail, and the openings of the upper side rail and the lower side rail may be formed to face each other.

The front door device may further include a striker mounted to a lower side of a predetermined portion of the center rail in the length direction and projected upward in the height direction.

The upper slider may include: an upper slider body of a substantially rectangular plate shape; two center rail rollers rotatably mounted to a front side of the upper slider body, arranged at a predetermined distance from each other in the width direction, to be inserted in the center rail for rolling as the upper rail moves; two upper side rail rollers rotatably mounted to the front side of the upper slider body, facing upward, arranged at a predetermined distance in the width direction for rolling according to movement of the upper rail; two lower side rail rollers rotatably mounted to the front side of the upper slider body, facing downward, arranged at a predetermined distance from each other in the width direction for rolling according to movement of the upper rail; and an upper flange and a lower flange projected from opposite edges of the upper slider body, each extended in a length direction substantially perpendicular to the respective edge, wherein the upper flange may have a first assembly through-hole formed therein, and the lower flange may have another first assembly through-hole, a second assembly through-hole, and a third assembly through-hole formed side by side.

The upper support structure may include a swing arm having one end rotatably and securely inserted between the upper flange and the lower flange of the upper slider body, and a mounting bracket having one end fastened to the other end of the swing arm, and the other end fixedly mounted to the vehicle body.

The swing arm may include: a swing arm body; a cylindrical first flange projected as one unit therewith from one side fore end of the swing arm body; and two second flanges projected as one unit therewith from the other side fore end of the swing arm body in the width direction and arranged at a left side and a right side of the swing arm body, wherein the first flange may have a cut-out portion such that one side edge of the cut-out portion forms a pressing edge, and a return spring may be built-in or coupled with the cylindrical first flange.

The lower flange of the upper slider body may have a rail locking device mounted thereto for selectively securing the upper rail to the upper slider.

The rail locking device may include: a first latch and a second latch rotatably mounted in a second assembly through-hole and a third assembly through-hole in the lower flange of the upper slider body, respectively; and a pressing spring for applying a pressure to the first latch and the second latch in a clockwise direction, wherein the first latch may include a first hook at one end thereof, and a pressing projection projected from an opposite side of the first hook so as to be pressed by the pressing edge, and the second latch may include a second hook for detachably hooking the striker, the second hook having an opened type hooking recess constructed of a first side and a second side which is substantially parallel to the first side and longer than the first side, and a latch projection for being detachably caught at the first hook of the first latch.

The lower rail may include a center rail positioned at a middle portion in a height direction of the lower rail, a first upper side rail positioned over the center rail, a second upper side rail positioned over the first upper side rail, and a lower side rail positioned under the center rail.

The center rail, the first upper side rail, the second upper side rail, and the lower side rail each may have a "⊏" shaped cross section continuous in a length direction thereof; the first upper side rail, the second upper side rail, and the lower side rail may have openings arranged substantially perpendicular to an opening of the center rail; and openings of the first upper side rail, and the second upper side rail may be formed to face the opening of the lower rail; the center rail, the first upper side rail, and the lower rail may be formed to have a substantially same length; the second upper side rail may be formed to have a length shorter than that of the first upper side rail.

The center rail may have a front side fore end, which faces a front side of the vehicle when the center rail is mounted to the vehicle body, with a mounting hole formed therein, wherein a hold open latch may be mounted to the mounting hole for coupling to the lower slider when the front door is opened or fully opened.

The first upper side rail may have a striker mounted to a rear fore end thereof which faces a rear side of the vehicle for coupling with the latch mounted to the front door when the front door is closed or fully closed.

The lower slider may include: a lower slider body having a substantially rectangular plate shape; two center rail rollers arranged at a predetermined distance from each other in a length direction thereof, rotatably mounted on a front side of the lower slider body, and inserted in the center rail of the lower rail for rolling; two upper side rail rollers arranged at a predetermined distance from each other in the length direction, rotatably mounted on the front side of the lower slider body adjacent to the two center rail rollers, and inserted in the first upper side rail of the lower rail for rolling; and two lower side rail rollers arranged at a predetermined distance from each other in the length direction adjacent to the two center rail rollers, rotatably mounted on the front side of the lower slider body in a direction opposite to the two upper side rail rollers, and inserted in the lower side rail of the lower rail for rolling, wherein the lower slider body may have a striker mounted to one side fore end of the front side of the lower slider body in the length direction thereof for detachably coupling to the hold open latch to hold an opened state of the front door.

The lower slider body may have an adjuster hole formed in the other side fore end in the length direction thereof, with an adjuster block mounted thereto and adjustable in a vertical direction in a width direction of the lower slider body, and an adjuster roller rotatably mounted to the adjuster block.

The lower slider body may have an upper flange and a lower flange formed as one unit therewith, the upper flange and the lower flange projected respectively from an upper edge and a lower edge extended in the length direction of the lower slider body and substantially perpendicular thereto; one end of the connection structure may be rotatably and securely inserted between the upper flange and the lower flange; and the upper flange may have a third latch rotatably mounted thereto for detachably latching on the lower rail.

The connection structure may include a swing arm having one end rotatably secured to the lower slider body, a rotation joint mounted to the other end of the swing arm, and a substantially square support bar having one end mounted to the rotation joint, and the other end fixedly connected to the upper rail as one unit therewith.

The swing arm may include: a swing arm body having a substantially square bar shape; an operation projection projected from one side fore end of the swing arm at a predetermined angle from the swing arm body as one unit therewith; a second upper side rail roller mounted to a fore end of the operation projection and rollingly inserted in the second upper side rail when the front door is in opening operation; and a return spring providing elastic restoring force to the swing arm.

The operation projection may have a working surface for pressing down the third latch to unlatch the third latch, and the first upper side rail of the lower rail may have a holding recess formed in a predetermined portion in a length direction thereof, for detachably catching the third latch.

The third latch may include a latch body, a hook formed on one side fore end of the latch body so as to be detachably caught at the holding recess in the first upper side rail, and a press down projection projected from an opposite portion of the hook on the latch body and substantially perpendicular thereto for being pressed down by the working surface of the operation projection as the swing arm swings.

The rotation joint may include a support joint fixedly mounted to a fore end of the swing arm body, and a coupling joint having one end coupled to the support joint to enable relative rotation and the other end having one end of the support bar inserted therein and coupled thereto.

The support joint may include a substantially semispherical support portion fixedly mounted to the fore end of the swing arm body, and a joint portion formed as one unit with the support portion and extended upward from a center thereof to have a plurality of coupling grooves formed at fixed intervals along a length of the support joint. The coupling joint may include a cylindrical portion seated on and rotatably supported by a substantially semispherical surface of the support portion, having coupling projections from an inside circumferential surface to be inserted in the coupling grooves for rotating along the coupling grooves, and a substantially square box shaped housing formed as one unit with the cylindrical portion and projected upward from a top side thereof, for inserting a lower end portion of the substantially square bar-shaped support bar therein to enable rotation of the support bar.

The front door device in accordance with various aspects of the present invention can open/close the front door even in a case a front door opening/closing space is small as the front door is opened/closed while sliding forward/backward in the length direction of the vehicle along the center rail mounted to the front door and the lower rail mounted to the vehicle body.

And, since the front door device in accordance with various aspects of the present invention does not require the upper rail and devices related thereto compared to the related art sliding door, not only reduction of a number of components, weight and a cost of the vehicle can be devised, design freedom of the vehicle can be improved, but also deterioration of exterior beauty of the vehicle can be prevented.

Moreover, since the front door can slide smoothly along the center rail and the lower rail after the front door swings to a predetermined angle securely, the opening/closing of the front door is soft, smooth and secure.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
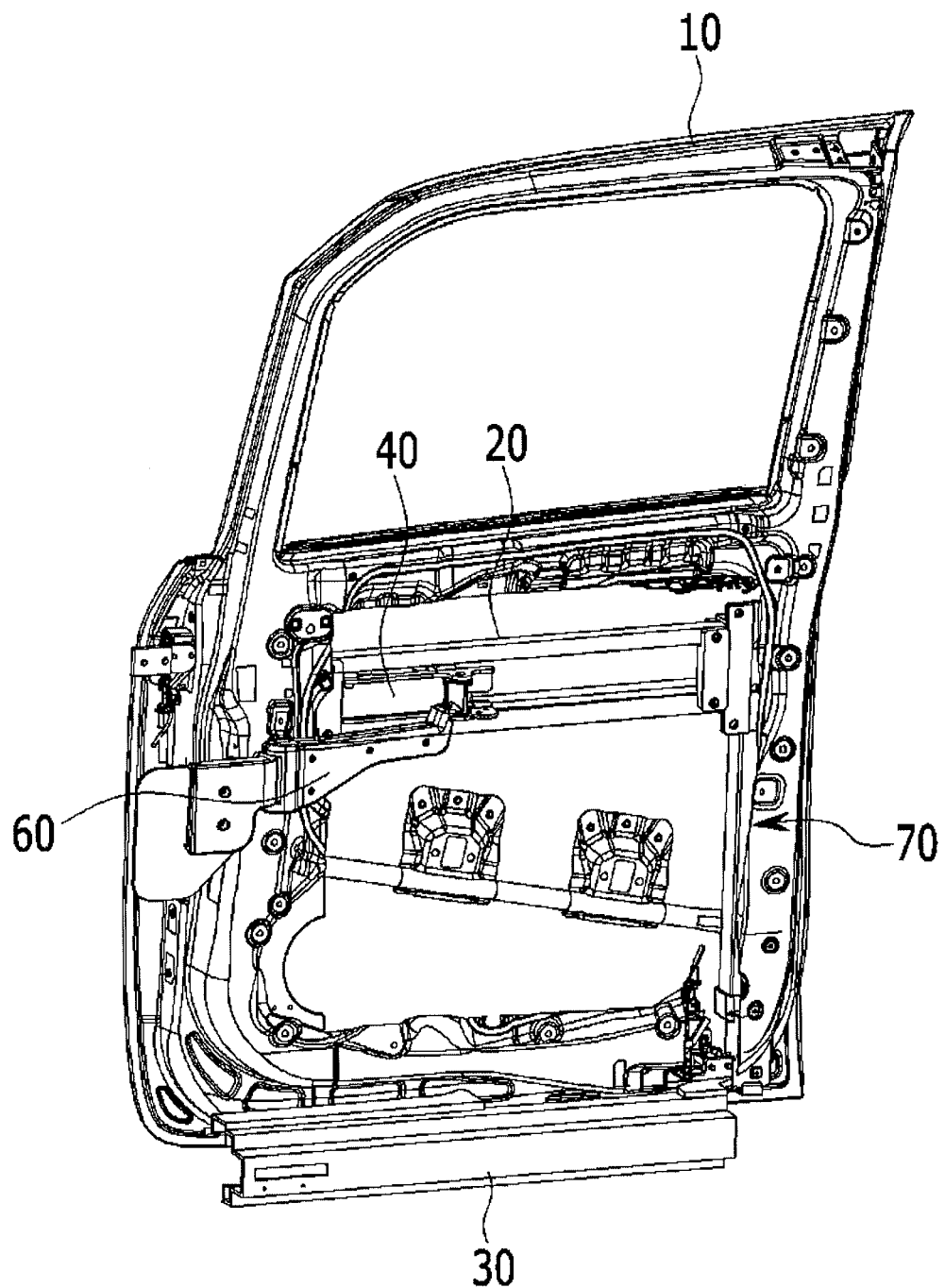
FIG. 1 illustrates a front view of an exemplary front door device in accordance with the present invention.

Referring to FIG. 1, the front door device in accordance with various embodiments of the present invention may include an upper rail 20 mounted to an upper side of a front door panel 10 extended in a width direction of the front door panel 10, a lower rail 30 mounted to a vehicle body, such as the vehicle body 110 illustrated in FIGS. 17(A)-17(D), extended in a length direction of the vehicle body, an upper slider 40 inserted in the upper rail 20 for supporting the upper rail 20, a lower slider 50 mounted or inserted in the lower rail 30 to be movable along the lower rail 30, an upper support structure 60 having one end connected to the upper slider 40 and the other end mounted to the vehicle body for supporting the upper slider 40 on the vehicle body, and a connection structure 70 connected between the lower slider 50 and the upper rail 20.

Figure 2:
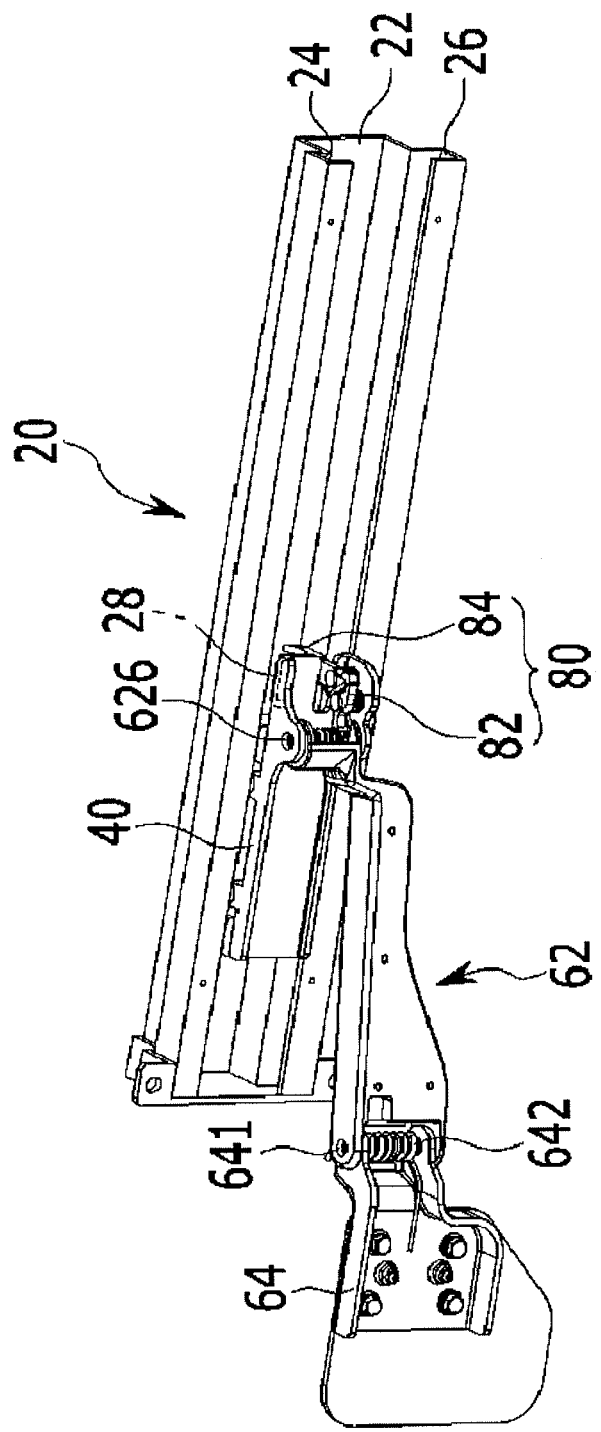
FIG. 2 illustrates a perspective view of an upper rail and an upper support structure coupled together in an exemplary front door device in accordance with the present invention.

Referring to FIG. 2, the upper rail 20 may include a center rail 22 positioned at middle or middle portion in a height direction, an upper side rail 24 positioned over the center rail 22, and a lower side rail 26 positioned under the center rail 22. The upper rail 20 may have a structure in which the center rail 22, the upper side rail 24, and the lower side rail 26 are formed as one unit.

Each of the center rail 22, the upper side rail 24, and the lower side rail 26 may have a structure in which a "⊏" character shaped cross section is continuous in the length direction. The center rail 22 has an opening to which openings of the upper side rail 24 and the lower side rail 26 may be arranged perpendicular or substantially perpendicular respectively to face each other.

There may be a striker 28 mounted to a lower side of a predetermined portion of the center rail 22 in the length direction projected upward in a height direction. The striker 28 may be formed in a substantially "U" shape.

Figure 3:
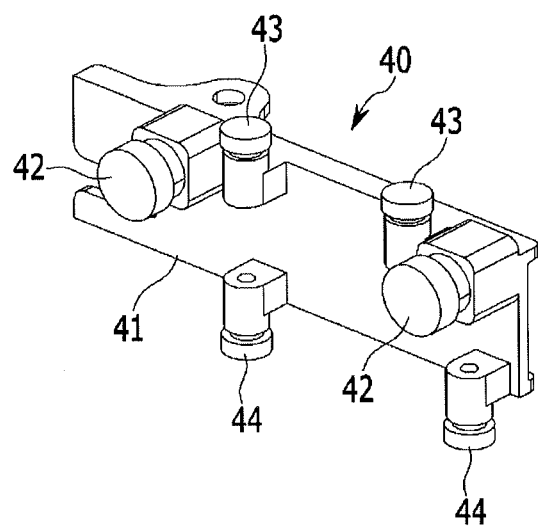
FIG. 3 illustrates a perspective view of an upper slider of an exemplary front door device in accordance with the present invention.
Figure 4:
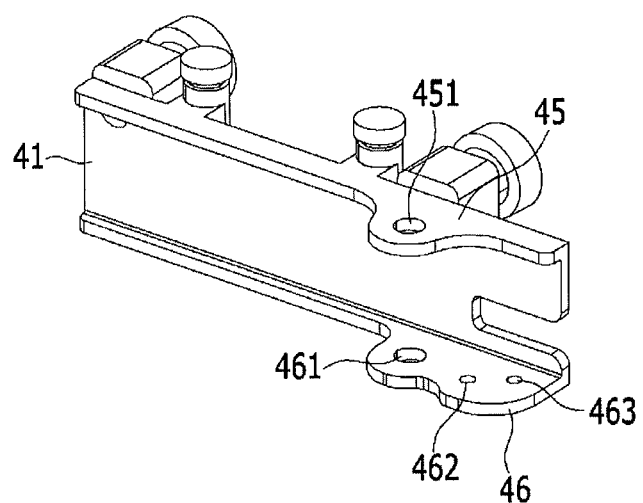
FIG. 4 illustrates another perspective view of an upper slider of an exemplary front door device in accordance with the present invention.

The upper rail 20 may have the upper slider 40 mounted thereto slidably inserted therein. Referring to FIGS. 3 and 4, the upper slider 40 may include an upper slider body 41 of a substantially rectangular plate shape.

Rotatably mounted to a front side of the upper slider body 41, there may be center rail rollers such as two center rail rollers 42 arranged at a predetermined distance from each other in a width direction so to be inserted in the center rail 22 for rolling according to movement of the upper rail 20.

Rotatably mounted to the front side of the upper slider body 41 to face upward, there may be upper side rail rollers such as two upper side rail rollers 43 arranged at a predetermined distance from each other in the width direction for rolling according to movement of the upper rail 20.

Rotatably mounted to the front side of the upper slider body 41 to face downward, there may be lower side rail rollers such as two lower side rail rollers 44 arranged at a predetermined distance from each other in the width direction for rolling according to movement of the upper rail 20.

There may be an upper flange 45 and a lower flange 46 formed projected from opposite edges extended in a width direction perpendicular or substantially perpendicular to the edges respectively, wherein the upper flange 45 may have a first assembly hole 451 formed therein to pass therethrough, and the lower flange 46 may have a first assembly hole 461, a second assembly hole 462, and a third assembly hole 463 formed side by side to pass through the lower flange 46.

Figure 5:
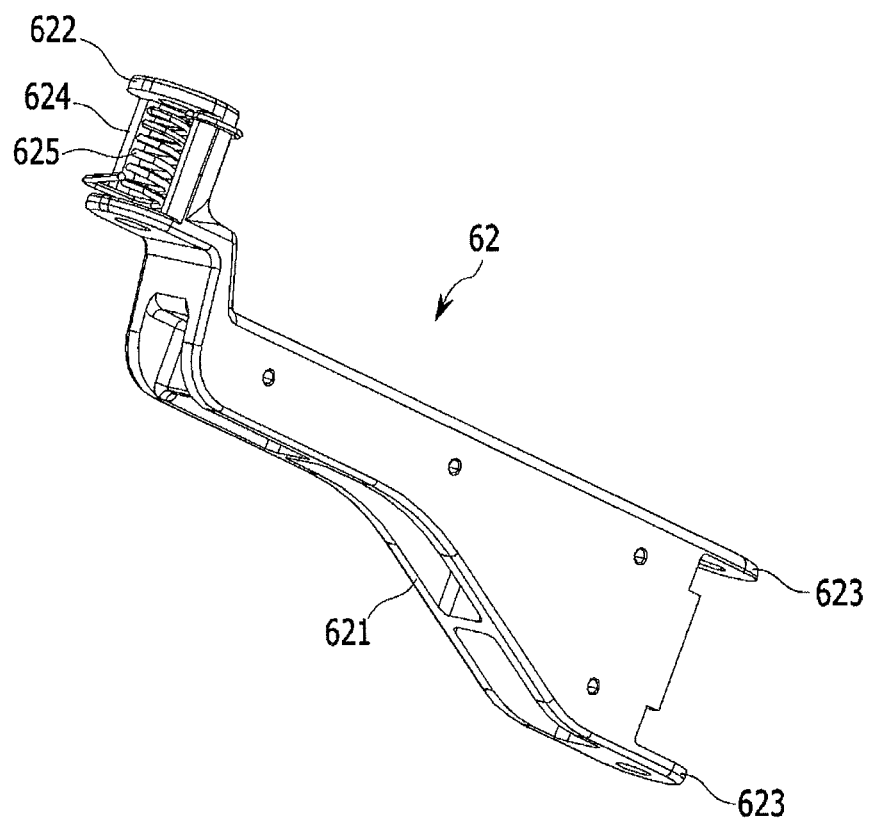
FIG. 5 illustrates a perspective view of a swing arm of an upper support structure in an exemplary front door device in accordance with the present invention.

Referring to FIG. 5, the upper support structure 60 may include a swing arm 62 having one end rotatably and securely inserted between the upper flange 45 and the lower flange 46 of the upper slider body 41.

The swing arm 62 may include a swing arm body 621, a cylindrical first flange 622 projected, and extended, from one side fore end of the swing arm body 621 as one unit therewith, and two second flanges 623 projected, and extended, from the other side fore ends of the swing arm body 622 as one unit therewith arranged on a left side and a right side of the swing arm body 62 in a width direction.

The first flange 622 has a cut-out portion such that one side edge of the cut-out portion forms a pressing edge 624 for pressing a latch to be described later to rotate the latch. Built in the cylinder of the first flange 622, there is a return spring 625 for returning the swing arm 62 to an original position after a swing motion.

Referring to FIG. 2, the first flange 622 of the swing arm 62 is inserted and rotatably secured between the upper flange 45 and the lower flange 46 of the upper slider body 41 with an assembly pin 626 which passes through the upper flange 45 and the lower flange 46.

The second flange 623 of the swing arm body 621 may be secured to, and supported by, a mounting bracket 64, and the mounting bracket 64 may be mounted to a vehicle body, such as the vehicle body 110 illustrated in FIGS. 17(A)-17(D). Between the two second flanges 623 of the swing arm body 621, one end of the mounting bracket 64 may be inserted and secured with a pass through assembly pin 641. Therefore, the swing arm 62 can swing around the mounting bracket 64.

In order to make the swing arm 62 to return to an original position after the swing arm 62 swings round the mounting bracket 64, a return spring 642 may be mounted and wound on an outside circumference of the assembly pin 641.

Figure 6:
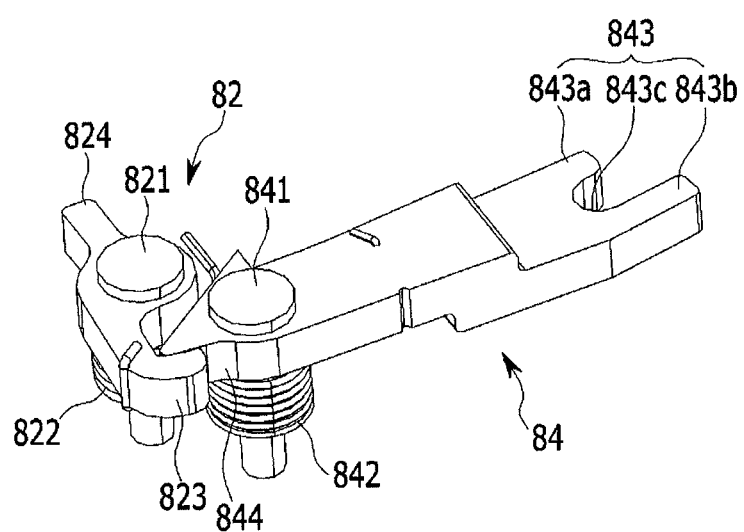
FIG. 6 illustrates a perspective view of a locking device of an exemplary front door device in accordance with the present invention.

Referring to FIGS. 2 and 6, the lower flange 46 of the upper slider body 41 may have a rail locking device 80 mounted thereto. The rail locking device 80 may include latches such as a first latch 82 and a second latch 84 rotatably mounted to the lower flange 46 of the upper slider body 41.

The first latch 82 may be assembled to the second assembly hole 462 with an assembly pin 821. The assembly pin 821 may have a pressing spring 822 mounted and wound around an outside circumference thereof for applying a pressure to the first latch 82 in a clockwise direction.

The first latch 82 may include a hook 823 at one end thereof. The first latch 82 may include a pressing projection 824 formed projected from an opposite side of the hook 823 with reference to the assembly pin 821 so as to be pressed by the pressing edge 624.

The second latch 84 may be assembled to the third assembly hole 463 with an assembly pin 841. The assembly pin 841 may have a pressing spring 842 mounted wound on an outside circumference thereof for applying a pressure to the second latch 84 in a clockwise direction.

The second latch 84 may include a hook 843 having an opened type hooking recess 843*c* constructed of a first side 843*a* having a short length, and a second side 843*b* substantially parallel to the first side 843*a* and having a length relatively longer than the first side, and the hook 843 may be detachably caught by the striker 28 at the open type hooking recess 843*c*. The second latch 84 may include a latch projection 844 for being detachably caught at the hook 823 of the first latch 82.

The first latch 82 and the second latch 84 construe a locking member for locking or unlocking the rail 20 to/from the upper slider 40. FIG. 2 illustrates the upper rail 20 and the upper slider 40 locked as one unit with the two first latch 82 and the second latch 84.

Consequently, the upper rail 20 and the upper slider 40 are unable to make relative movement with respect to the other.

Figure 7:
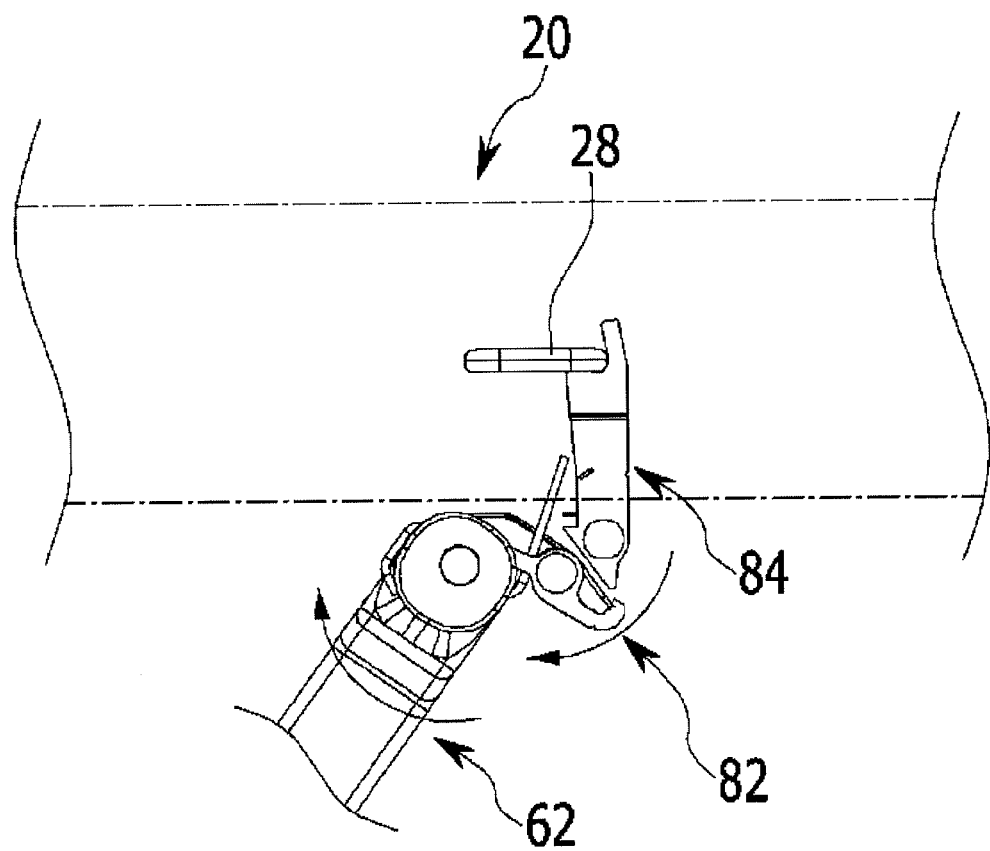
FIG. 7 illustrates a schematic view showing a state in which an upper rail is locked by a locking device in an exemplary front door device in accordance with the present invention, for describing operation thereof.

Referring to FIG. 7, if the swing arm 62 swings about 80° owing to swing caused by opening of the front door, the pressing edge 624 of the swing arm 62 presses the pressing projection 824 of the first latch 82, to rotate the first latch 82 in an anti-clockwise direction centered on the assembly pin 821 accordingly, making the latch projection 844 of the second latch 84 freed from the hook 823 of the first latch 82, thereby making the second latch 84 free from the first latch 82.

Therefore, the upper rail 20 is in a state locked at the slider 40 only with the second latch 84 caught at the striker 28, i.e., in a state the striker 28 is inserted in, and latched on, the open type latch recess 843*b* of the hook 843 of the second latch 84.

Figure 8:
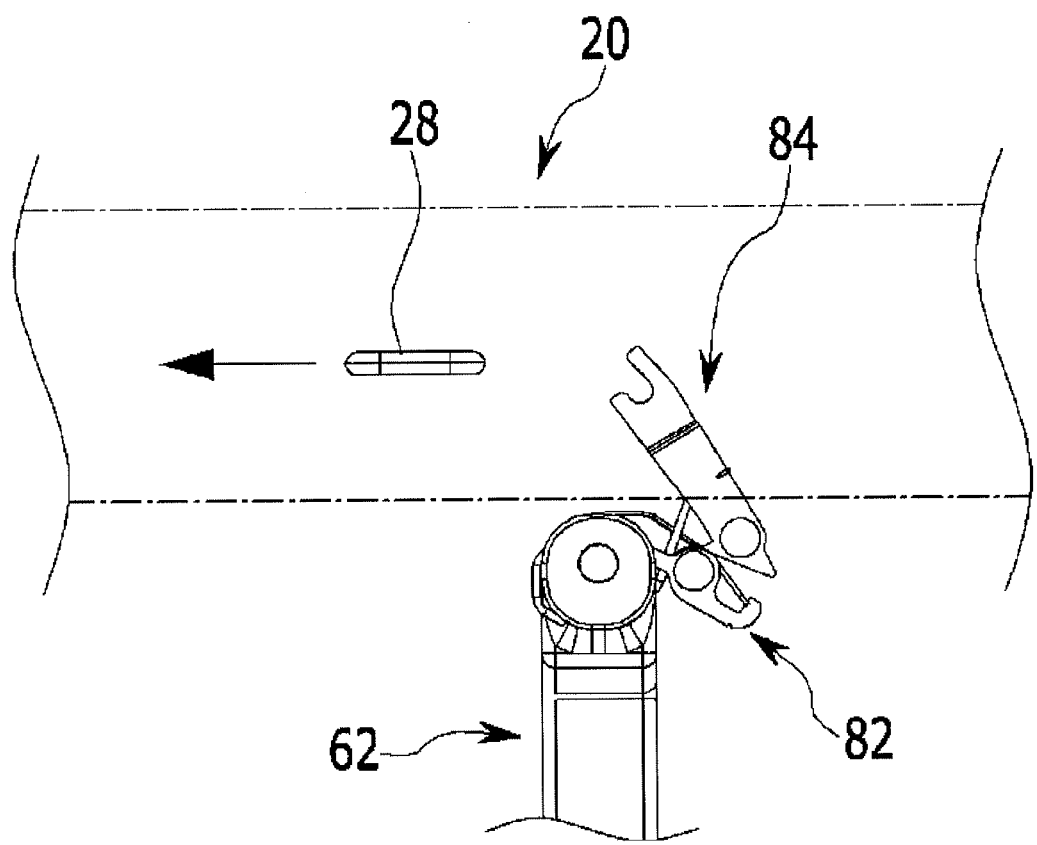
FIG. 8 illustrates a schematic view showing a state in which an upper rail is unlocked from a locking device in an exemplary front door device in accordance with the present invention, for describing operation thereof.

Referring to FIG. 8, in a state described above, if the upper rail 20 moves in a direction away from the second latch 84, i.e., the front door moves forward in the length direction of the vehicle, since the striker 28 at the upper rail 20 moves away from the latch recess 843 in the hook 843 along the opening smoothly, the upper rail 20 is unlocked from the upper slider 40.

Accordingly, the upper rail 20 can move forward in a state the upper rail 20 is supported on the upper slider 40, and, as the rollers of the upper slider 40 built in the upper rail 20 roll in a state the rollers are in contact with the upper rail 20 according to movement of the upper rail 20, the movement of the upper rail 20 becomes smooth.

In the meantime, if the upper rail 20 moves backward, making the second latch 84 to be latched at the striker 28, the upper rail 20 is coupled to, and locked at the upper slider 40, and the second latch 84 is, in turn, caught and locked at the first latch 82, making the upper rail 20 caught at a fixed body, such as the vehicle body 110 illustrated in FIGS. 17(A)-17(D), through the swing arm 62 and the mounting bracket 64.

Figure 9:
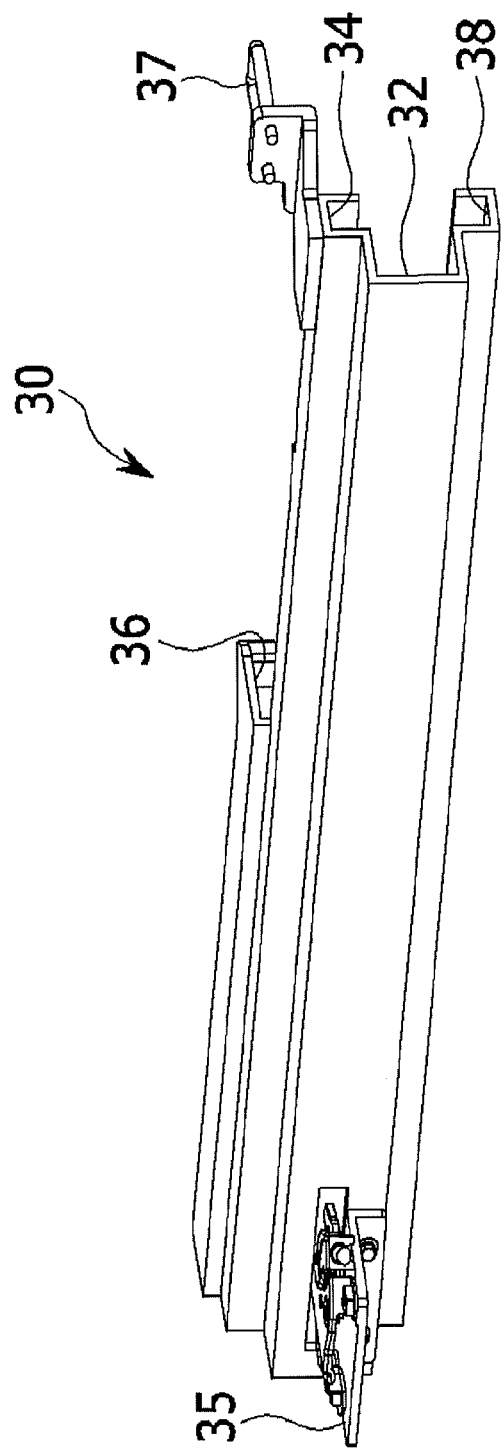
FIG. 9 illustrates a perspective view of a lower rail of an exemplary front door device in accordance with the present invention.

Referring to FIG. 9, the lower rail 30 may include a center rail 32 positioned at middle or middle portion in a height direction of the lower rail 30, a first upper side rail 34 positioned over the center rail 32, a second upper side rail 36 positioned over the first upper side rail 34, and a lower side rail 38 positioned under the center rail 38.

The lower rail 30 may have a structure in which the center rail 32, the first upper side rail 34, the second upper side rail 36, and the lower side rail 38 are formed as one unit. The center rail 32, the first upper side rail 34, the second upper side rail 36, and the lower side rail 38 may have "⊏" shaped cross sections continuous in the length direction, respectively.

The first upper side rail 34, the second upper side rail 36, and the lower side rail 38 may have openings arranged perpendicular or substantially perpendicular to an opening of the center rail 32 and the openings of the first upper side rail 34, and the second upper side rail 36 are formed to face the opening of the lower side rail 38.

While the center rail 32, the first upper side rail 34, and the lower side rail 38 are formed to have substantially the same length, the second upper side rail 36 is formed to have a length shorter than the first upper side rail 34.

The center rail 32 may have one side fore end, in a length direction thereof, i.e., a front side fore end which faces a front side of the vehicle when the center rail 32 is mounted to the vehicle body, with a mounting hole formed therein, to which a hold open latch 35 may be mounted. The hold open latch 35 serves to couple to the lower slider 50 to hold an opened state of the front door when the front door is opened or fully opened.

There may be a striker 37 fixedly mounted to a rear fore end of the first upper side rail 34 facing a rear side of the vehicle. The striker 37 may be mounted to face a direction the same as the opening of the center rail 32. The striker 37 serves to couple to a latch mounted to the front door to hold a closed state of the front door when the front door is closed or fully closed.

Figure 10:
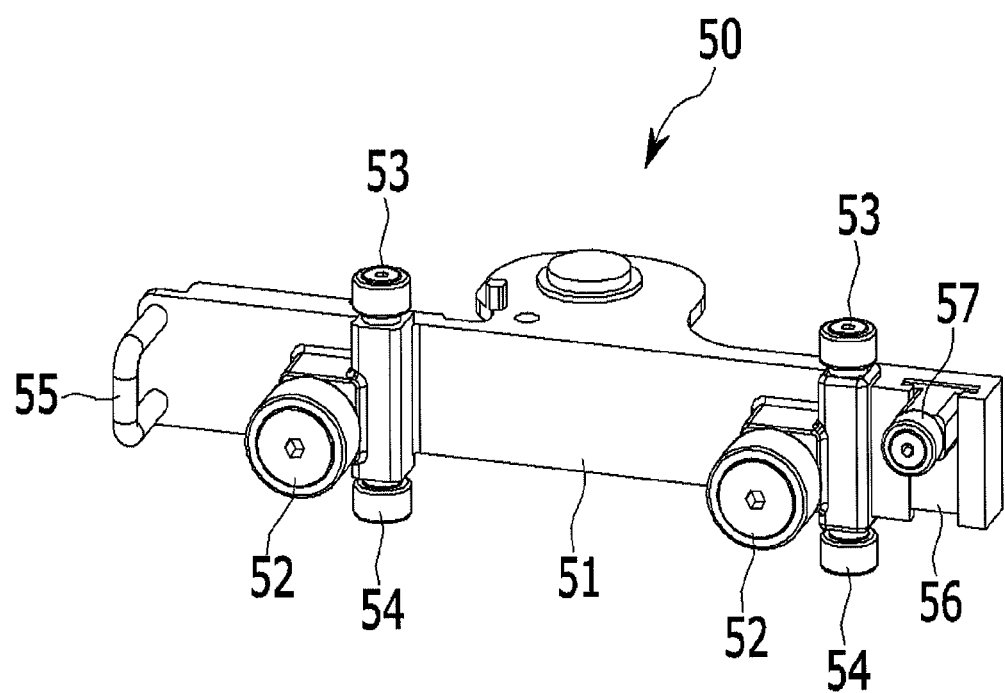
FIG. 10 and FIG. 11 illustrate perspective views of a lower slider of an exemplary front door device in accordance with the present invention.
Figure 11:
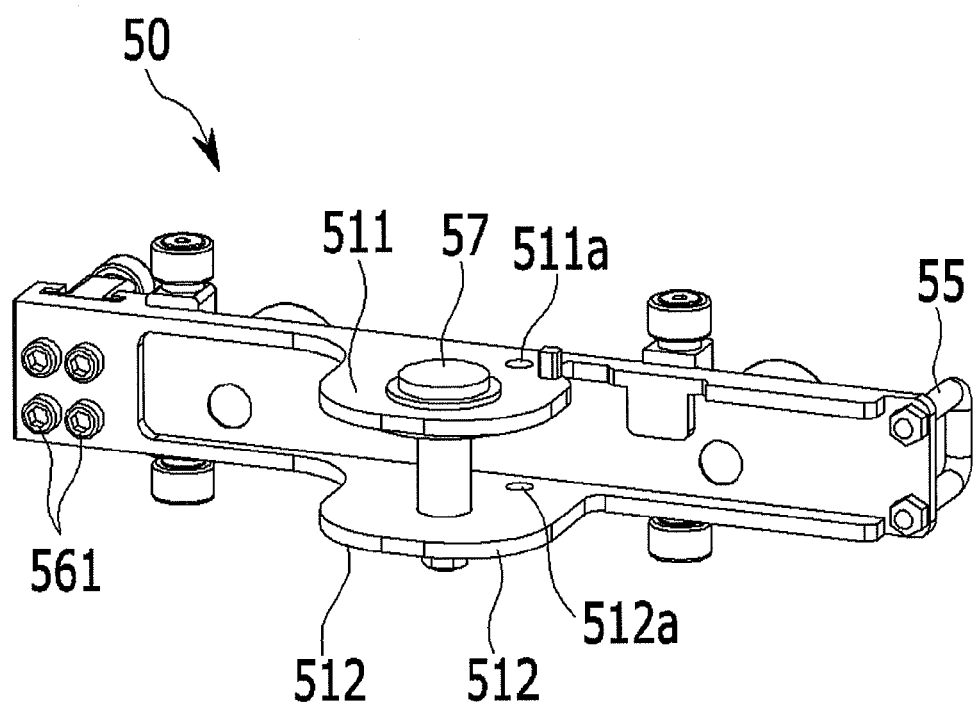

Referring to FIGS. 10 and 11, the lower slider 50 may include a lower slider body 51 having a substantially rectangular plate shape, and a plurality of rollers such as two center rail rollers 52 arranged at a predetermined distance from each other in a length direction thereof rotatably mounted on a front side of the lower slider body 51 inserted in the center rail 32 of the lower rail 30 for rolling, two upper side rail rollers 53 arranged at a predetermined distance from each other in the length direction rotatably mounted on the front side of the lower slider body 51 adjacent to the two center rail rollers 52 inserted in the first upper side rail 34 of the lower rail 30 for rolling, and two lower side rail rollers 54 arranged at a predetermined distance from each other in the length direction adjacent to the two center rail rollers 52 rotatably mounted on the front side of the lower slider body 51 to in a direction opposite to the two upper side rail rollers 53 inserted in the lower side rail 36 of the lower rail 30 for rolling.

And, the lower slider body 51 may have a striker 55 mounted to one side fore end of the front side of the slower slider body 51 in the length direction thereof for detachably coupling to the hold open latch 35 to hold an opened state of the front door.

Figure 13:
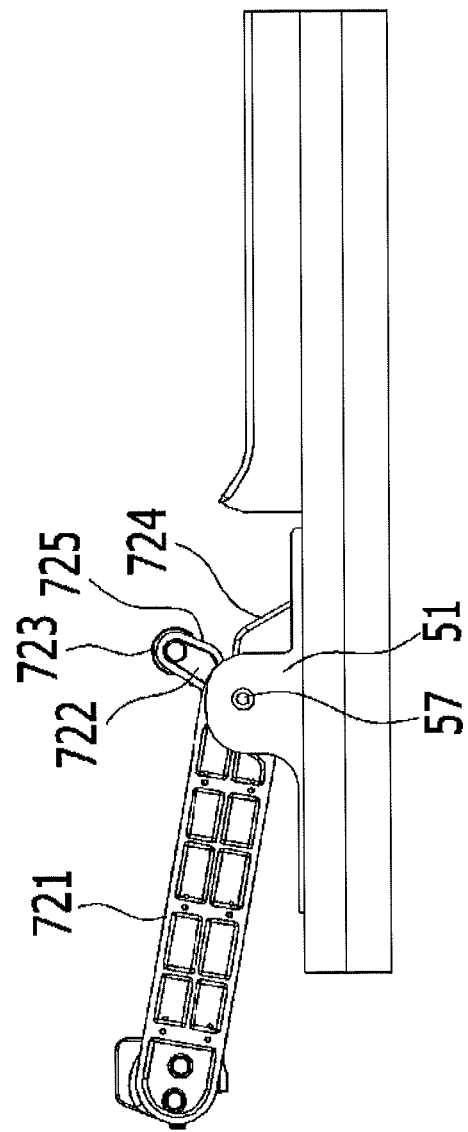
FIG. 13 and FIG. 14 illustrate perspective views of a lower rail coupled to a connection structure in an exemplary front door device in accordance with the present invention, respectively.

And, the lower slider body 51 has an adjuster hole formed in the other side fore end in the length direction thereof, with an adjuster block 56 mounted thereto adjustable in a vertical direction along a width direction of the lower slider body 51, to which an adjuster roller 57 is rotatably mounted (see, e.g., FIG. 13). That is, depending on a position of the adjuster block 56 fastened to the adjuster hole with an adjuster bolt 561, a position of the adjuster roller 57 can be adjusted.

The adjuster roller 57 serves to abut to an upper side of the center rail 32 of the lower rail 30 to support a load of the front door applied thereto through the connection structure, and may have a function of absorbing tolerances of the lower rail 30 and the rollers.

The lower slider body 51 may have an upper flange 511 and a lower flange 512 formed as one unit therewith projected from an upper edge and a lower edge extended in the length direction of the lower slider body 51 perpendicular or substantially perpendicular thereto, respectively. Between the upper flange 511 and the lower flange 512, one end of the connection structure 70 is inserted and rotatably secured with a pass through assembly pin 57.

The upper flange 511 and the lower flange 512 may have assembly holes 511*a* and 512*a* formed therein respectively for mounting a third latched to be described later thereto.

Figure 12:
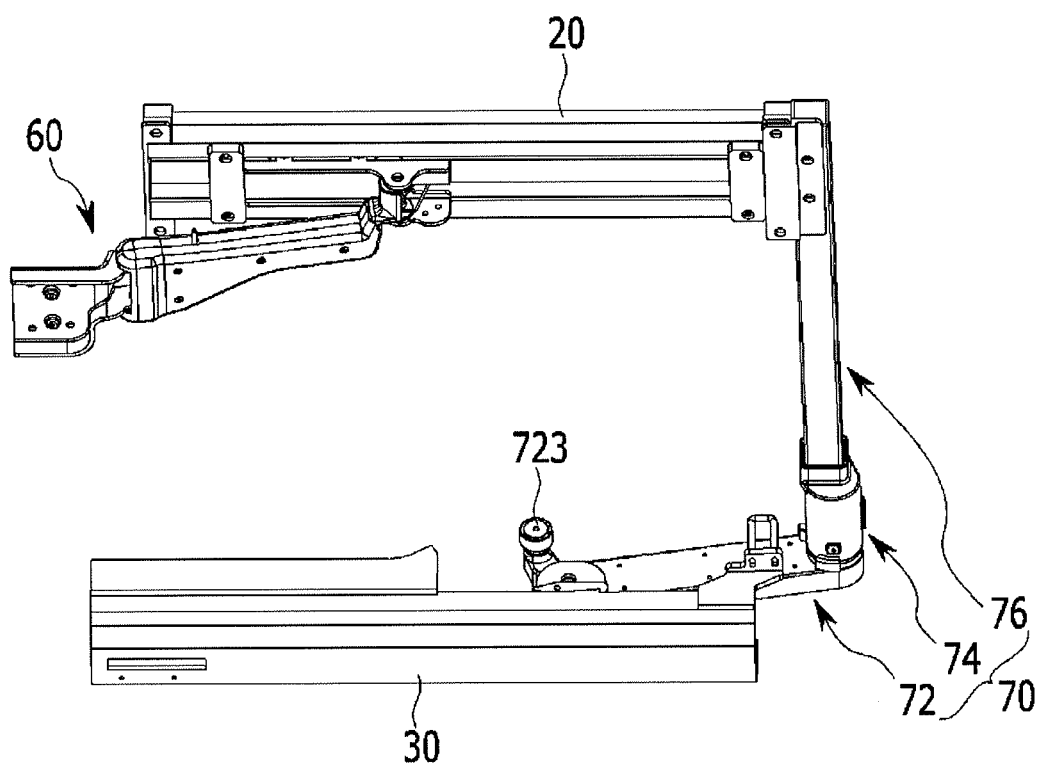
FIG. 12 illustrates a perspective view showing a configuration of key parts of an exemplary front door device in accordance with the present invention.

Referring to FIGS. 12 and 13, the connection structure 70 may include a swing arm 72 having one end secured to the lower slider body 51 with the assembly pin 57, a rotation joint 74 mounted to the other end of the swing arm 72, and a substantially square support bar 76 having one end mounted to the rotation joint 74 and the other end fixedly connected to the upper rail 20 as one unit therewith.

The swing arm 72 may include a swing arm body 721 having a substantially square bar shape, an operation projection 722 formed projected from one side fore end of the swing arm 72 at a predetermined angle from the swing arm body 721 as one unit therewith, a second upper side rail roller 723 mounted to a fore end of the operation projection 722 for rolling inserted in the second upper side rail 36 when the front door is in opening operation, and a return spring 724 mounted wound on an outside circumference of the assembly pin 57 for providing elastic restoring force to the swing arm 72.

The operation projection 722 may have a working surface 725 for unlatching the third latch 30 to be described later.

If the swing arm 72 swings by, for example, about 80° due to opening action of the front door, the second upper side roller 723 is inserted in the second upper side rail 36 to obstruct additional swing of the swing arm 72.

Figure 14:
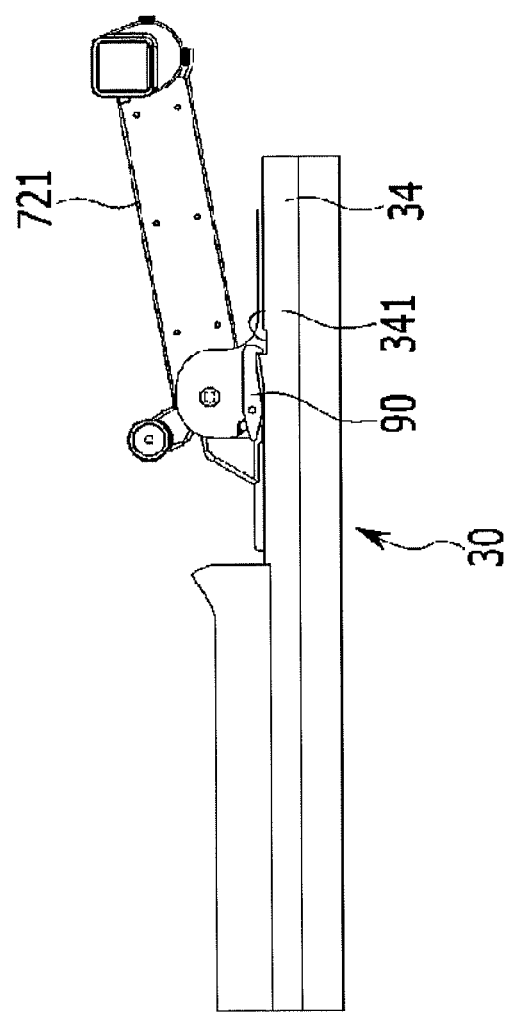

Referring to FIG. 14, the first upper side rail 34 of the lower rail 30 may have a holding recess 341 formed in a predetermined portion in a length direction thereof, and the third latch 90 may be rotatably mounted in the assembly holes 511*a* and 512*a* of the upper flange 511 and the lower flange 512 of the lower slider body 51.

Figure 15:
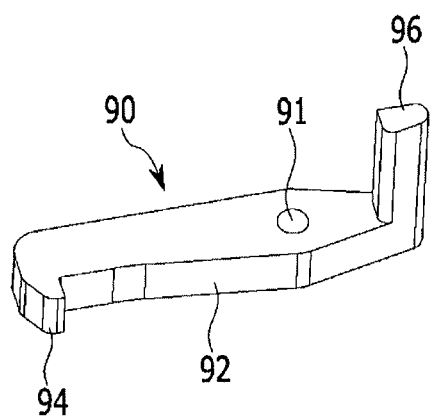
FIG. 15 illustrates a perspective view of a third latch of an exemplary front door device in accordance with the present invention.

Referring to FIG. 15, the third latch 90 may include a latch body 92 having a pass through assembly hole 91 formed therein to be aligned with the assembly holes 511*a* and 512*a* in the upper flange 511 and the lower flange 512, a hook 94 formed on one side fore end of the latch body 92 so as to be detachably caught at the holding recess 341 in the first upper side rail 34, and a press down projection 96 formed projected from an opposite portion of the hook 94 on the latch body 92 perpendicular or substantially perpendicular thereto for being pressed down by the working surface 725 of the operation projection 722 as the swing arm 72 swings.

If the swing arm 72 swings in a range of, for example, up to about 80° according to swing of the front door, since the working surface 725 of the operation projection 722 presses down the press down projection 96 to rotate the third latch 90 in an anticlockwise direction with reference to the assembly pin assembled in the assembly hole 91 as shown in FIG. 14, separating the hook 94 from the holding recess 341 in the first upper side rail 34, the lower slider 50 moves along the lower rail 30, enabling the front door to slide to a front side of the vehicle.

Figure 16:
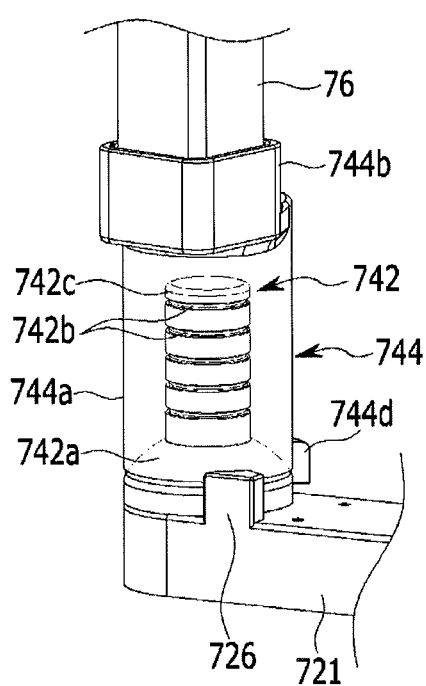
FIG. 16 illustrates a partial cut-away view of a lower swing arm and a connection structure of an exemplary front door device in accordance with the present invention.

Referring to FIG. 16, the rotation joint 74 may include a support joint 742 fixedly mounted to a fore end of the swing arm body 721, and a coupling joint 744 having one end coupled to the support joint 742 to enable relative rotation and the other end having one end of the support bar 76 inserted therein coupled thereto.

The support joint 742 may include a substantially semi-spherical support portion 742a fixedly mounted to the fore end of the swing arm body 721, and a joint portion 742c formed as one unit with the support portion 742a extended upward from a center or a center portion thereof to have a plurality of coupling grooves 742b formed at fixed intervals along a length of the support joint 742.

The coupling joint 744 may include a cylindrical portion 744a seated on, and, rotatably supported on, the semispherical surface of the support portion 742a to have coupling projections from an inside circumferential surface to be inserted in the coupling grooves 742b for rotating along the coupling grooves 742b, and a square box shaped housing 744b formed as one unit with the cylindrical portion 744a projected upward from a top side thereof, for inserting a lower end portion of the square bar shaped support bar 76 therein enabling to rotate together.

When the front door swings outward in a width direction of the vehicle from a closed state for opening the front door, relative movement takes place between the support joint 742 and coupling joint 744, which is continued until a first stopper projection 744d formed projected from a lower side of an outside circumference of the cylindrical portion 744a is brought into contact with a second stopper projection 726 formed projected from the swing arm body 721.

Figure 17A:
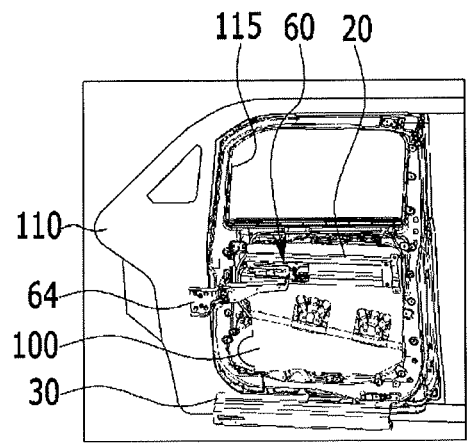
FIG. 17(A), FIG. 17(B), FIG. 17(C) and FIG. 17(D) illustrate of an exemplary front door device in accordance with the present invention, describing operation thereof respectively.

Referring to FIG. 17A, the front door opening 115 in the vehicle body 110 has the front door 100 closed thereon to close the vehicle.

The mounting bracket 64 of the upper support structure 60 is mounted fixedly secured to a portion of the vehicle body 110 adjacent to the door opening 115 formed in the vehicle body 110, the upper rail 20 is fixedly mounted to the front door 100 in a width direction thereof, the upper slider 40 is inserted in the upper rail 20, and the upper slider 40 is secured to the swing arm 62 of the upper support structure 60.

And, the lower rail 30 is also fixedly secured to the vehicle body 110, the lower rail 30 has the lower slider 50 inserted therein, and the lower slider 50 is connected to the front door 100 through the connection structure 70.

In a state the front door 100 is closed, the relative movement between the upper slider 40 and the upper rail 20 is locked by the locking device 80, the latch mounted to the front door 100 is latched on the striker 55 of the lower rail 30 to lock a relative movement between the front door 100 and the lower rail 30, and the third latch 90 of the lower rail 30 is latched on the holding recess 341 in the lower rail 30 to lock a relative movement between the lower slider 50 and the lower rail 30.

If the front door 100 is opened in a state the front door 100 is secured to the vehicle body 110, the front door 100 swings outward in a width direction of the vehicle, rotating the swing arm 62 of the upper support structure 60 and the swing arm 72 of the lower connection structure 70 in a range of, for example, up to about 80°, respectively.

The swing of the front door 100 is continued until the two stopper projections 726 and 744d interfere with each other.

Figure 17B:
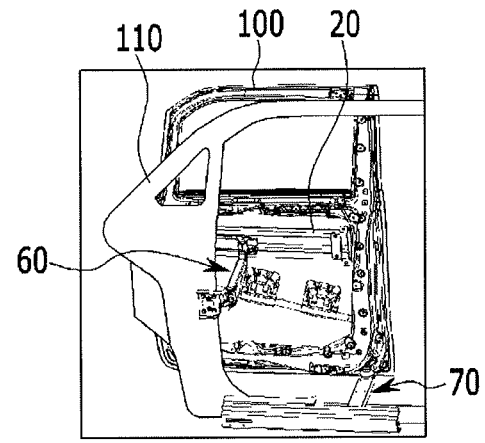

Upon finishing the swing of the front door 100, the striker 28 of the upper rail 20 is in a separably caught state at the second latch 84 of the upper slider 40, and the third latch 90 is in a state in which the third latch 90 is moved out of the holding recess 341 enabling the lower slider 50 and the lower rail 30 to make relative movement to each other (See FIG. 17B).

Figure 17C:
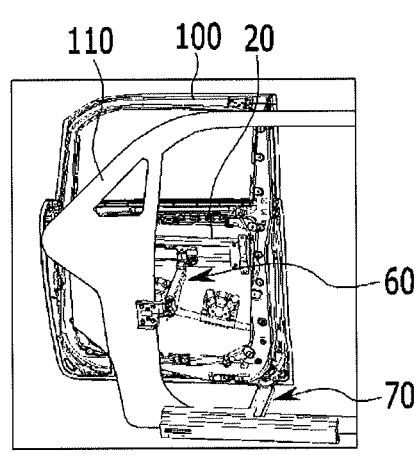
Figure 17D:
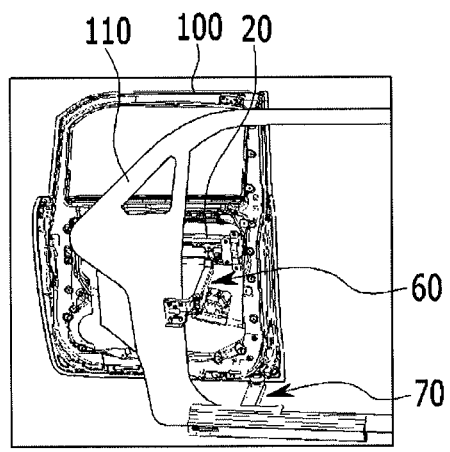

Under this state, if the front door 100 is moved forward in the length direction of the vehicle, the front door 100 slides along the lower rail 30 in a state an upper side of the front door 100 is supported by the upper slider 40 and in a state the front door 100 is supported on the lower rail 30 through the lower slider 50 by the connection structure 70, and the upper slider 40 supports the upper rail 20 while rolling according to forward movement of the upper rail 20 in a state the upper slider 40 is inserted in the upper rail 20 (See FIG. 17C).

If the front door 100 is opened fully as the front door 100 slides forward in the length direction of the vehicle, the striker 55 on the lower slider 50 is caught at the hold open latch 35 to hold the opened state of the front door 100. (See FIG. 17D).

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front door device in a vehicle comprising:
   a front door;
   an upper rail mounted to the front door in a width direction thereof;
   an upper slider inserted in the upper rail to support the upper rail;
   a lower rail mounted to a vehicle body;
   a lower slider inserted in the lower rail and movable along the lower rail;
   an upper support structure having a first end connected to the upper slider and a second end mounted to the vehicle body for supporting the upper slider; and
   a connection structure for connecting the lower slider to the upper rail,
   wherein the upper rail includes:
      a center rail positioned at a middle portion of the upper rail in a height direction;
      an upper side rail positioned over the center rail; and
      a lower side rail positioned under the center rail
      wherein the center rail, the upper side rail and the lower side rail each has an open cross section continuous in a length direction thereof;

openings of the upper side rail and the lower side rail are arranged substantially perpendicular to an opening of the center rail; and the openings of the upper side rail and the lower side rail are formed to face each other, and wherein the upper slider includes:

an upper slider body of a substantially rectangular plate shape;

two center rail rollers rotatably mounted to a front side of the upper slider body, arranged at a predetermined distance from each other in the width direction, to be inserted in the center rail for rolling as the upper rail moves;

two upper side rail rollers rotatably mounted to the front side of the upper slider body, facing upward, arranged at a predetermined distance in the width direction for rolling according to movement of the upper rail;

two lower side rail rollers rotatably mounted to the front side of the upper slider body, facing downward, arranged at a predetermined distance from each other in the width direction for rolling according to movement of the upper rail; and an upper flange and a lower flange projected from opposite edges of the upper slider body, each extended in a length direction substantially perpendicular to the respective edge, wherein the upper flange has a first assembly through-hole formed therein, and the lower flange has another first assembly through-hole, a second assembly through-hole, and a third assembly through-hole formed side by side.

2. The front door device of claim 1, further comprising:
a striker mounted to a lower side of a predetermined portion of the center rail in the length direction and projected upward in the height direction.

3. The front door device of claim 1, wherein the upper support structure includes:

a swing arm having a first end rotatably and securedly inserted between the upper flange and the lower flange of the upper slider body; and a mounting bracket having a first end fastened to a second end of the swing arm, and a second end fixedly mounted to the vehicle body.

4. The front door device of claim 3, wherein the swing arm includes:

a swing arm body;

a cylindrical first flange projected as one unit therewith from a first side fore end of the swing arm body; and two second flanges projected as one unit therewith from a second side fore end of the swing arm body in the width direction and arranged at a left side and a right side of the swing arm body, wherein the first flange has a cut-out portion such that one side edge of the cut-out portion forms a pressing edge, and a return spring is built-in or coupled with the cylindrical first flange.

5. The front door device of claim 4, wherein the lower flange of the upper slider body has a rail locking device mounted thereto for selectively securing the upper rail to the upper slider;

wherein the rail locking device includes:

a first latch and a second latch rotatably mounted in a second assembly through-hole and a third assembly through-hole in the lower flange of the upper slider body, respectively; and a pressing spring for applying a pressure to the first latch and the second latch in a clockwise direction, wherein the first latch includes a first hook at one end thereof, and a pressing projection projected from an opposite side of the first hook so as to be pressed by the pressing edge, and the second latch includes a second hook for detachably hooking a striker, the second hook having an opened type hooking recess constructed of a first side and a second side which is substantially parallel to the first side and longer than the first side, and a latch projection for being detachably caught at the first hook of the first latch.

6. The front door device of claim 1, wherein the lower rail includes:

a center rail positioned at a middle portion in a height direction of the lower rail;

a first upper side rail positioned over the center rail;

a second upper side rail positioned over the first upper side rail; and a lower side rail positioned under the center rail.

7. The front door device of claim 6, wherein the center rail, the first upper side rail, the second upper side rail, and the lower side rail each has an open cross section continuous in a length direction thereof;

the first upper side rail, the second upper side rail, and the lower side rail have openings arranged substantially perpendicular to an opening of the center rail;

openings of the first upper side rail and the second upper side rail are formed to face the opening of the lower rail;

the center rail, the first upper side rail, and the lower rail are formed to have a substantially same length; and the second upper side rail is formed to have a length shorter than that of the first upper side rail.

8. The front door device of claim 7, wherein the center rail has a front side fore end, which faces a front side of the vehicle when the center rail is mounted to the vehicle body, wherein a hold open latch is mounted to the front side fore end for coupling to the lower slider when the front door is opened or fully opened.

9. The front door device of claim 8, wherein the first upper side rail has a striker mounted to a rear fore end thereof which faces a rear side of the vehicle for coupling with a latch mounted to the front door when the front door is closed or fully closed.

10. The front door device of claim 8, wherein the lower slider includes:

a lower slider body having a substantially rectangular plate shape;

two center rail rollers arranged at a predetermined distance from each other in a length direction thereof, rotatably mounted on a front side of the lower slider body, and inserted in the center rail of the lower rail for rolling;

two upper side rail rollers arranged at a predetermined distance from each other in the length direction, rotatably mounted on the front side of the lower slider body adjacent to the two center rail rollers, and inserted in the first upper side rail of the lower rail for rolling; and two lower side rail rollers arranged at a predetermined distance from each other in the length direction adjacent to the two center rail rollers, rotatably mounted on the front side of the lower slider body in a direction opposite to the two upper side rail rollers, and inserted in the lower side rail of the lower rail for rolling, wherein the lower slider body has a striker mounted to one side fore end of the front side of the lower slider body in the length direction thereof for detachably coupling to the hold open latch to hold an opened state of the front door.

11. The front door device of claim 10, wherein the lower slider body has an adjuster hole formed in the second side fore end in the length direction thereof, with an adjuster block mounted thereto and adjustable in a vertical direction in a width direction of the lower slider body, and an adjuster roller rotatably mounted to the adjuster block.

12. The front door device of claim 11, wherein:
the lower slider body has an upper flange and a lower flange formed as one unit therewith, the upper flange and the lower flange projected respectively from an upper edge and a lower edge extended in the length direction of the lower slider body and substantially perpendicular thereto;
one end of the connection structure is rotatably and securely inserted between the upper flange and the lower flange; and
the upper flange has a third latch rotatably mounted thereto for detachably latching on the lower rail.

13. The front door device of claim 12, wherein the connection structure includes:
a swing arm having a first end rotatably secured to the lower slider body;
a rotation joint mounted to a second end of the swing arm; and
a substantially square support bar having a first end mounted to the rotation joint, and a second end fixedly connected to the upper rail as one unit therewith.

14. The front door device of claim 13, wherein the swing arm includes:
a swing arm body having a substantially square bar shape;
an operation projection projected from one side fore end of the swing arm at a predetermined angle from the swing arm body as one unit therewith;
a second upper side rail roller mounted to a fore end of the operation projection and rollingly inserted in the second upper side rail when the front door is in opening operation; and
a return spring providing elastic restoring force to the swing arm.

15. The front door device of claim 14, wherein:
the operation projection has a working surface for pressing down the third latch to unlatch the third latch, and the first upper side rail of the lower rail has a holding recess formed in a predetermined portion in a length direction thereof, for detachably catching the third latch.

16. The front door device of claim 15, wherein the third latch includes:
a latch body;
a hook formed on one side fore end of the latch body so as to be detachably caught at the holding recess in the first upper side rail; and
a press down projection projected from an opposite portion of the hook on the latch body and substantially perpendicular thereto for being pressed down by the working surface of the operation projection as the swing arm swings.

17. The front door device of claim 13, wherein the rotation joint includes:
a support joint fixedly mounted to a fore end of the swing arm body, and
a coupling joint having a first end coupled to the support joint to enable relative rotation and a second end having one end of the support bar inserted therein and coupled thereto.

18. The front door device of claim 17, wherein:
the support joint includes:
a substantially semispherical support portion fixedly mounted to the fore end of the swing arm body, and
a joint portion formed as one unit with the support portion and extended upward from a center thereof to have a plurality of coupling grooves formed at fixed intervals along a length of the support joint; and
the coupling joint includes:
a cylindrical portion seated on and rotatably supported by a substantially semispherical surface of the support portion, having coupling projections from an inside circumferential surface to be inserted in the coupling grooves for rotating along the coupling grooves, and
a substantially square box shaped housing formed as one unit with the cylindrical portion and projected upward from a top side thereof, for inserting a lower end portion of the substantially square bar-shaped support bar therein to enable rotation of the support bar.

* * * * *